United States Patent
Savolainen (10) Patent No.: US 11,528,346 B2
(45) Date of Patent: Dec. 13, 2022

(54) IPV4 COMMUNICATIONS USING 6LOWPAN HEADER COMPRESSION MECHANISMS

(71) Applicant: Nokia Technologies Oy, Espoo (FI)

(72) Inventor: Teemu Savolainen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 62 days.

(21) Appl. No.: 15/503,000

(22) PCT Filed: Aug. 21, 2014

(86) PCT No.: PCT/US2014/052178
§ 371 (c)(1),
(2) Date: Feb. 9, 2017

(87) PCT Pub. No.: WO2016/028303
PCT Pub. Date: Feb. 25, 2016

(65) Prior Publication Data
US 2017/0237835 A1 Aug. 17, 2017

(51) Int. Cl.
*H04L 69/167* (2022.01)
*H04L 61/251* (2022.01)
(Continued)

(52) U.S. Cl.
CPC ............ *H04L 69/167* (2013.01); *H04L 12/66* (2013.01); *H04L 61/251* (2013.01); *H04L 69/04* (2013.01);
(Continued)

(58) Field of Classification Search
CPC ..... H04L 69/167; H04L 12/66; H04L 61/251; H04L 69/04; H04L 61/6004; H04L 61/6068
(Continued)

(56) References Cited

U.S. PATENT DOCUMENTS 7,215,667 B1 * 5/2007 Davis .................. H04L 12/4633
370/389
7,610,330 B1 * 10/2009 Quinn ..................... H04L 45/02
709/201
(Continued)

FOREIGN PATENT DOCUMENTS

CN 101645823 A * 2/2010
EP 2416531 A1 * 2/2012 ......... H04L 12/5692
(Continued)

OTHER PUBLICATIONS

International Search Report and Written Opinion received for corresponding Patent Cooperation Treaty Application No. PCT/US2014/052178, dated May 11, 2015, 12 pages.
(Continued)

*Primary Examiner* — Umar Cheema
*Assistant Examiner* — Tony Williams
(74) *Attorney, Agent, or Firm* — Mintz Levin Cohn Ferris Glovsky and Popeo, P.C.

(57) ABSTRACT

Methods and apparatus, including computer program products, are provided for communications. In one aspect there is provided a method. The method may include sending, by a gateway, an advertisement including an internet protocol version 6 over low power wireless personal area network context option carrying a well-known prefix, the well-known prefix indicating to a node that the gateway provides an uplink in accordance with internet protocol version 4; and receiving, at the gateway, a first packet received via the wireless network in accordance with internet protocol version 6, the first packet including a destination address in accordance with internet protocol version 4. Related apparatus, systems, methods, and articles are also described.

18 Claims, 5 Drawing Sheets

(51) Int. Cl.
  *H04L 69/04* (2022.01)
  *H04L 12/66* (2006.01)
  *H04L 101/604* (2022.01)
  *H04L 101/668* (2022.01)

(52) U.S. Cl.
  CPC .. *H04L 2101/604* (2022.05); *H04L 2101/668* (2022.05)

(58) Field of Classification Search
  USPC .......................................................... 709/245
  See application file for complete search history.

(56) References Cited

U.S. PATENT DOCUMENTS

| | | | |
|---|---|---|---|
| 2001/0040895 A1* | 11/2001 | Templin | H04L 61/6004 370/466 |
| 2002/0012320 A1* | 1/2002 | Ogier | H04L 41/12 370/252 |
| 2005/0111494 A1* | 5/2005 | Kecskemeti | H04L 45/742 370/521 |
| 2005/0152298 A1* | 7/2005 | Thubert | H04L 29/06 370/312 |
| 2009/0109924 A1* | 4/2009 | Sato | H04W 36/0055 370/331 |
| 2009/0185538 A1* | 7/2009 | Choi | H04W 8/02 370/331 |
| 2010/0202355 A1* | 8/2010 | Kim | H04W 36/385 370/328 |
| 2010/0254399 A1* | 10/2010 | Shin | H04L 12/5692 370/415 |
| 2011/0216743 A1* | 9/2011 | Bachmann | H04L 63/164 370/331 |
| 2012/0011234 A1* | 1/2012 | Xu | H04L 29/12915 709/221 |
| 2012/0163362 A1 | 6/2012 | Noh et al. | |
| 2013/0070745 A1* | 3/2013 | Nixon | H04L 45/74 370/338 |
| 2013/0201316 A1* | 8/2013 | Binder | H04L 67/12 348/77 |
| 2013/0201999 A1 | 8/2013 | Savolainen et al. | |
| 2013/0235862 A1* | 9/2013 | Kahng | H04L 61/103 370/338 |
| 2013/0235871 A1* | 9/2013 | Brzozowski | H04L 61/1511 370/392 |
| 2013/0282498 A1* | 10/2013 | Korhonen | H04L 29/12915 705/14.73 |
| 2013/0297756 A1* | 11/2013 | Vaswani | H04L 29/12254 709/221 |
| 2014/0056301 A1* | 2/2014 | Hu | H04L 69/22 370/392 |
| 2014/0064259 A1 | 3/2014 | Lee et al. | |
| 2014/0122607 A1* | 5/2014 | Fodor | H04W 4/70 709/204 |
| 2014/0126581 A1* | 5/2014 | Wang | H04W 4/70 370/431 |
| 2014/0167979 A1* | 6/2014 | Soma | H04L 61/2015 340/870.02 |

FOREIGN PATENT DOCUMENTS

| | | |
|---|---|---|
| KR | 100937924 B1 | 1/2010 |
| WO | WO-2011042767 A1 | 4/2011 |
| WO | WO-2014075502 A1 | 5/2014 |

OTHER PUBLICATIONS

Tsirtsis BT P Srisuresh Campio Communications G: "Network Address Translation—Protocol Translation (NAT-PT); rfc2766.txt", Feb. 1, 2000,Feb. 1, 2000 (Feb. 1, 2000), XP015008549.

Cao China Mobile Z: "Considerations for Lightweight IP Gateways; draft-cao-lwig-gateway-00 txt", Considerations for Lightweight IP Gateways; draft-cao-lwig-gateway-oo.txt, Internet Engineering Task Force, IETF; Standardworkingdraft, Internet Society(ISOC) 4, Rue Des Falaises CH—1205 Geneva, Switzerland, Mar. 7, 2011 (Mar. 7, 2011), pp. 1-7, XP015074329.

Zanella Andrea et al: "Internet of Things for Smart Cities", IEEE Internet of Things Journal, IEEE, vol. 1, No. 1, Feb. 1, 2014 (Feb. 1, 2014), pp. 22-32, XP011547493.

Bruno Da Silva Campos et al: "Design and Construction of Wireless Sensor Network Gateway with IPv4/IPv6 Support", ICC 2011—2011 IEEE Internationalconference on Communications—Jun. 5-9, 2011—Kyoto, Japan, IEEE, Piscataway, NJ, USA, Jun. 5, 2011 (Jun. 5, 2011), pp. 1-5, XP031908601.

Nieminen J et al: "Transmission of IPv6 Packets over Bluetooth Low Energy; draft-ietf-6lowpan-btle-00.txt", Transmission of IPV6 Packets Over Bluetooth Low Energy; draft-ietf-6lowpan-btle-00. txt, Internet Engineering Task Force, IETF; Standardworkingdraft, Internet Society (ISOC) 4, Rue Des Falaises CH—1205 Geneva, Switzerland, Apr. 21, 2011 (Apr. 21, 2011), pp. 1-13, XP015075408.

Kushalnagar Intel Corp G Montenegro Microsoft Corporation C Schumacher Danfoss A/S N: "IPv6 over Low-Power Wireless Personal Area Networks (6LoWPANs): Overview, Assumptions, Problem Statement,and Goals; rfc4919.txt", Aug. 1, 2007, Aug. 1, 2007 (Aug. 1, 2007), XP015052457.

"6LoWPAN Gateway plus IBM IoT Foundation give instant SensorTag Gratification", Design Spark, Retrieved on Oct. 24, 2018, Webpage available at :https://www.rs-online.com/designspark/6lowpan-gateway-plus-IBM-iot-foundation-give-instant-sensortag-gratification.

"Internet of Things", TELECOM Bretagne, Retrieved on Oct. 24, 2018, Webpage available at: http://c2.touta.in/wp-content/uploads/2013/05/TEC_ITAM.pdf.

"SAKER 6lowpan IoT Gateway", Weptech, Retrieved on Oct. 24, 2018, Webpage available at :https://www.weptech.de/en/6lowpan/gateway-saker.html.

Bagnulo et al., "DNS64: DNS Extensions for Network Address Translation from IPv6 Clients to IPv4 Servers", RFC 6147, Internet Engineering Task Force (IETF), Apr. 2011, pp. 1-33.

Bagnulo et al., "Stateful NAT64: Network Address and Protocol Translation from IPv6 Clients to IPv4 Servers", RFC 6146, Internet Engineering Task Force (IETF), Apr. 2011, pp. 1-46.

Bao et al., "IPv6 Addressing of IPv4/IPv6 Translators", RFC 6052, Internet Engineering Task Force (IETF), Oct. 2010, pp. 1-19.

Boucadair., "Discovering NAT64 IPv6 Prefixes Using the Port Control Protocol (PCP)", RFC 7225, Internet Engineering Task Force (IETF), May 2014, pp. 1-18.

Deering et al., "Internet Protocol, Version 6 (IPv6) Specification", RFC 2460, Network Working Group, Dec. 1998, pp. 1-40.

Hui et al., "Compression Format for IPv6 Datagrams Over IEEE 802.15.4-Based Networks", RFC 6282, Internet Engineering Task Force (IETF), Sep. 2011, pp. 1-25.

Narten et al., "Neighbor Discovery for IP version 6 (IPv6)", RFC 4861, Network Working Group, Sep. 2007, pp. 1-98.

Savolainen et al., "Discovery of the IPv6 Prefix Used for IPv6 Address Synthesis", RFC 7050, Internet Engineering Task Force (IETF), Nov. 2013, pp. 1-23.

Shelby et al., "Neighbor Discovery Optimization for IPv6 over Low-Power Wireless Personal Area Networks (6LoWPANs)", RFC 6775, Internet Engineering Task Force (IETF), Nov. 2012, pp. 1-56.

Xu et al., "Connect Internet with Sensors by 6Lo WPAN", Journal of Networks, vol. 8, No. 7, Jul. 2013, pp. 1480-1487.

Yum et al., "Methods to use 6LoWPAN in IPv4 Network", The 9th International Conference on Advanced Communication Technology, Feb. 12-14, 2007, 969-972.

* cited by examiner

IPV4 COMMUNICATIONS USING 6LOWPAN HEADER COMPRESSION MECHANISMS

RELATED APPLICATION

This application was originally filed as Patent Cooperation Treaty Application No. PCT/US2014/052178 filed Aug. 21, 2014.

FIELD

The subject matter described herein relates to wireless communications.

BACKGROUND

The Internet of Things (IoT) and other machine-based communication networks are increasingly being deployed. As a consequence, low power networks are being deployed to support the needs of IoT. These low power networks may support IoT devices having limited power, limited data rate, and/or limited overall capabilities.

SUMMARY

Methods and apparatus, including computer program products, are provided for communications.

In some example embodiments, there may be provided method. The method may include sending, by a gateway, an advertisement including an internet protocol version 6 over low power wireless personal area network context option carrying a well-known prefix, the well-known prefix indicating to a node that the gateway provides an uplink in accordance with internet protocol version 4; and receiving, at the gateway, a first packet received via the wireless network in accordance with internet protocol version 6, the first packet including a destination address in accordance with internet protocol version 4.

In some variations, one or more of the features disclosed herein including the following features can optionally be included in any feasible combination. The first packet may include a compressed header including the destination address in accordance with internet protocol version 4. The advertisement may include at least one of a router advertisement or an internet control message protocol version 6 router advertisement. The gateway may generate a second packet configured in accordance with internet protocol version 4, the second packet including the destination address. The gateway may forward the second packet via the uplink at the gateway. The well-known prefix may signal to the node to send the first packet as a compressed internet protocol version 6 packet and to include the destination address in accordance with internet protocol version 4. The well-known prefix may include a predetermined value indicating translation, by the gateway, from internet protocol version 6 to internet protocol version 4. The well-known prefix may include an address having at least the following form 64:ff9b::/96. The well-known prefix may represent the gateway does not provide an internet protocol version 6 uplink. The gateway may generate by at least decompressing the first packet by at least extracting the destination address. The gateway may include at least one of a gateway or a router. The node may include at least one of a sensor, an actuator, a machine, or an internet of things node. The wireless network may include at least one of a Bluetooth low energy wireless network, a IEEE 802.15.4 network, or a low power wireless personal area network.

In some example embodiments, there may be provided method. The method may include receiving, by a node, an advertisement including an internet protocol version 6 over low power wireless personal area network context option carrying a well-known prefix, the well-known prefix indicating to the node that a gateway provides an uplink in accordance with internet protocol version 4; and generating, by the node in response to the received well-known prefix, a first packet in accordance with internet protocol version 6, the first packet including a destination address in accordance with internet protocol version 4.

In some variations, one or more of the features disclosed herein including the following features can optionally be included in any feasible combination. The mode may forward the first packet to the gateway via the wireless network in accordance with internet protocol version 6. The well-known prefix may signal to the node to send the first packet as a compressed internet protocol version 6 packet and to include the destination address in accordance with internet protocol version 4. The well-known prefix may include a predetermined value indicating translation at the gateway from internet protocol version 6 to internet protocol version 4. The well-known prefix may include an address having at least the following form 64:ff9b::/96. The well-known prefix may represent the gateway does not provide an internet protocol version 6 uplink. The first packet may include a compressed header including the destination address in accordance with internet protocol version 4.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings.

Like labels are used to refer to same or similar items in the drawings.

DETAILED DESCRIPTION

In some systems, only IPv6 (Internet Protocol version 6) may be supported by low power, short range IP-based networks operative with for example the Internet of Things (IoT). These low power networks may include for example Bluetooth low energy, IEEE 802.15.4, and/or other low power networks. The use of IPv4 (Internet Protocol version 4) for the nodes/radios on these low power networks is generally not considered useful or for that matter necessary given IPv4 is slowly being phased out in favor of IPv6 and/or the IPv4 address space may not robust enough to support the billions of nodes envisioned for the machines and sensors of the IoT. Moreover, the use of both IPv4 and IPv6 protocol stacks at an IoT node/radio may consume too much of the limited memory resources of the IoT device.

However, the IPv4 protocol continues to be a predominate protocol with IP-based networks and, in particular, the Internet. As such, some Internet gateways may not support IPv6, so these IPv6 low power nodes/radios and their low power networks may not be able to obtain IPv6 connectivity via the gateway to access for example other devices via the Internet. This limited gateway support of IPv6 may be problematic as IoT nodes may be addressed using IPv6 addresses, but not globally reachable via IPv6 due to some gateways having only IPv4 uplink support to the Internet.

In some example embodiments, an IPv6 IoT node may send IPv6 packets (which contain an IPv4 address) to a gateway configured to support only an IPv4 uplink). The gateway may then process the received packet and forward an IPv4 packet to the Internet and devices coupled to the Internet (for example, to cloud services or other devices).

Figure 1:
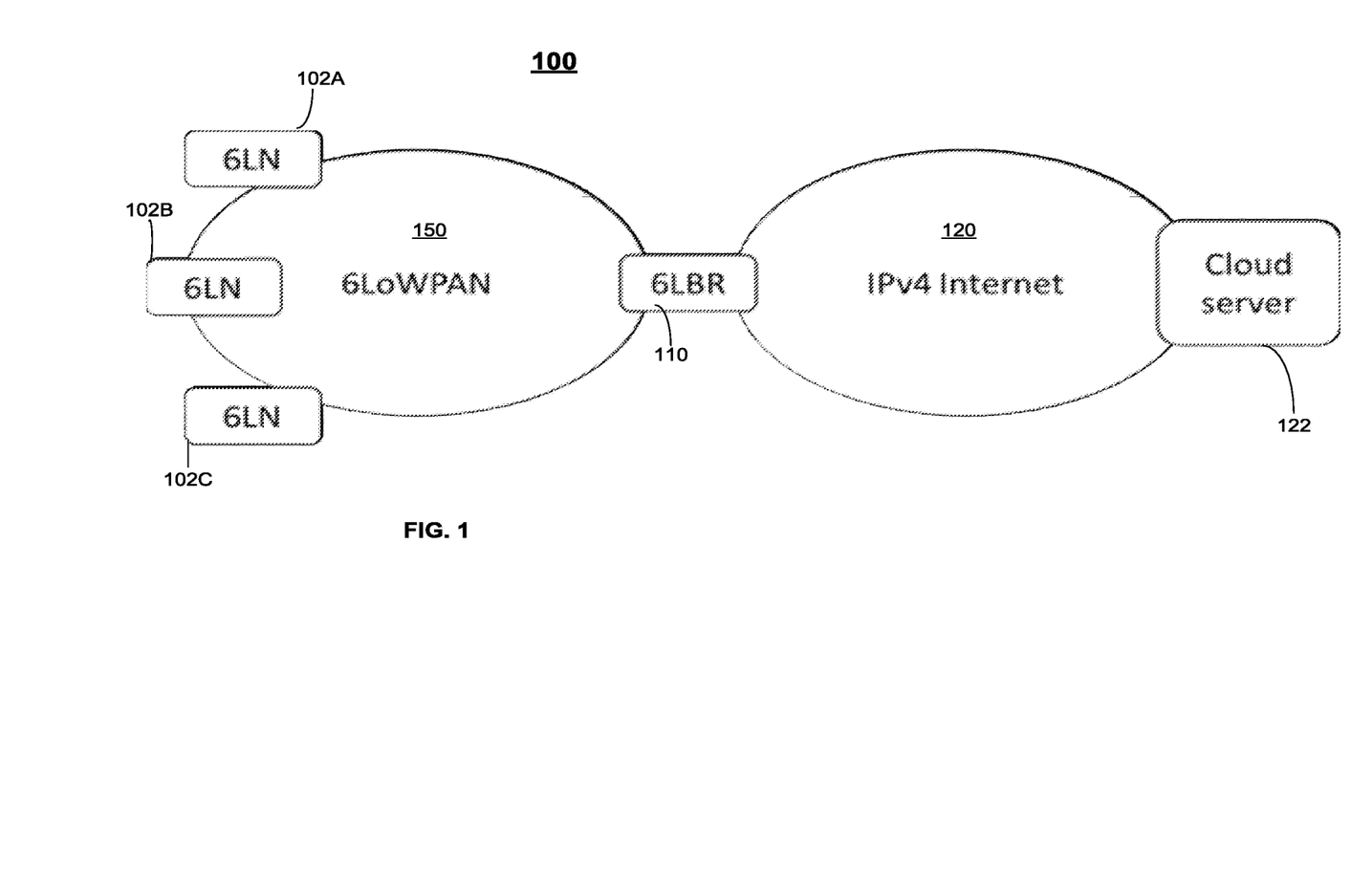
FIG. 1 depict an example of a system including nodes operating over a low power network, in accordance with some exemplary embodiments.

FIG. 1 depicts a system 100, in accordance with some example embodiments. The system 100 may include one or more nodes 102A-C (labeled 6LN). The nodes 102A-C may be implemented as IoT nodes configured to operate over a low power wireless network 150, such as an IPv6 over Low power Wireless Personal Area Network (6LoWPAN). For example, a 6LoWPAN node (6LN) 102A may be configured to communicate with another 6LN node 102B via the 6LoWPAN protocol 150, although other wireless technologies and/or protocols may be used as well. The nodes 102A-C may be implemented as a machine, a sensor, an actuator a wireless device/host, and/or any other wireless device or machine.

When network 150 is implemented as 6LoWPAN, network 150 may be configured to only support IPv6. System 100 may also include a gateway 110, such as a 6LoWPAN Border Router (6LBR). For example, a smartphone, cellphone, wireless access point/router, and/or other device may host the gateway 110, which couples to another network 120, such as the Internet (which is currently predominately IPv4-based), to access other devices, such as cloud server 122 and the like. When gateway 110 has limited (or no) IPv6 uplink support to the Internet as noted above, IoT nodes 102A-C may be addressed using IPv6 addresses, but not globally reachable via IPv6 due to gateway 110 having only (or very limited) IPv4 uplink support to the Internet 120.

Although FIG. 1 depicts access to cloud server 122, the access may be to any other type of IoT node, as well as other processors, computers, smartphones, cell phones, and/or the like.

Figure 2:
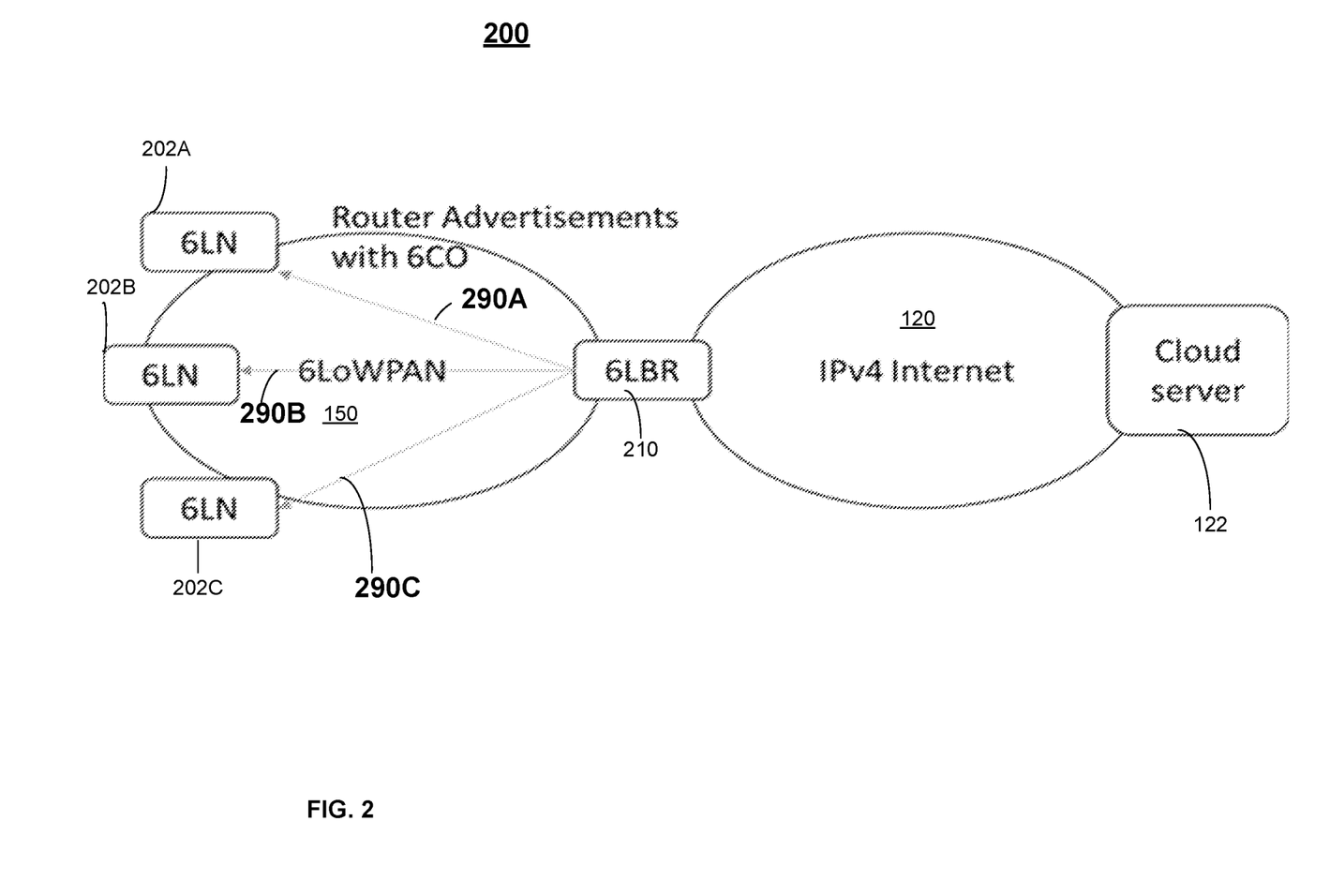
FIGS. 2-3 depict examples of systems including nodes operating over an IPv6 low power network coupled to a gateway having Internet Protocol version 4 (IPv4) uplink support to the Internet, in accordance with some exemplary embodiments.

FIG. 2 depicts a system 200, in accordance with some example embodiments. System 200 is similar to system 100 depicted in FIG. 1 in some respects. But system 200 includes devices, such as gateway 210 and nodes 202A-C configured to operate with gateway 210 having IPv4 uplinks to the Internet.

In some example embodiments, gateway 210 may be configured to utilize a certain indicator, such as well-known prefix (WKP) for IPv6/IPv4 protocol translation, to signal to nodes 202A-B that gateway 210 has IPv4 uplinks to the Internet. In the case of WKP, WKP may be defined in accordance with for example RFC 6052, in which case the WKP may take the following form 64:ff9b::/96, although the WKP may take other predetermined values as well. In the case of RFC 6052, an IPv4 address may be embedded in a network specific IPv6 prefix to form an IPv4-converted (for example, IPv6 addresses representing IPv4 nodes in an IPv6 network) and/or IPv4-translatable addresses (for example, IPv6 addresses assigned to IPv6 nodes for use with stateless translation). A WKP may take another form as well, such as a form that explicitly allows nodes to use link-local IPv6 addresses as source addresses when communicating to IPv4 destinations. Although this example refers to a specific type of stateless network address translation, other forms of network address translation protocols may be used as well.

In some example embodiments, the WKP may be carried inside, for example, a message, such as a 6LoWPAN Context Option (6CO) in accordance with for example RFC 6775, Neighbor Discovery Optimization for IPv6 over Low-Power Wireless Personal Area Networks, November 2012 (see, e.g., section 4.2), although the WKP may be carried by other types of messages and/or neighbor discovery messages as well. The gateway 210 may then transmit to one or more of the nodes 202A-C the WKP contained by 6LoWPAN Context Option as part of router advertisement message sent to nodes 202A-C to configure them. This may set up a compression context for the prefix of 64:ff9b::/96. The router advertisements may comprise the Internet Control Message Protocol version 6 (ICMPv6) router advertisements, although other types of message/advertisement messages may be used as well.

In some example embodiments, when nodes 202A-C receive the router advertisements including the 6CO containing WKP, nodes 202A-C may be signaled to recognize that gateway 210 has IPv4 uplink support (for example, capability to transmit IPv4 packets to for example the Internet or other network and/or no capability to transmit IPv6 packets via an uplink to for example the Internet or other network). To illustrate, the receipt of the 6CO containing WKP may signal to node 202A that gateway 210 has IPv4 uplink support to for example the Internet. When this is the case, node 202A may determine that packets being sent under this context option are forwarded by gateway 210 as IPv4 packets. As such, node 202A may send one or more packets to gateway 210, and the packets may be encoded in a format required by local network 150. For example, in the case of a 6LoWPAN network 150, the node 202A may send a compressed IPv6 packet having a 64-bit formatted Interface Identifier that identifies the destination's IPv4 address, which can be decompressed or extracted to enable the gateway 210 to forward the packet as an IPv4 packet to for example the Internet and the destination device, such as cloud server 122.

Under the WKP context option, gateway 210 may transmit packets from the nodes to IPv4 destinations, such as cloud server 122 and the like. For example, gateway 210 may configure header compression (for example, 6LoWPAN header compression) on the local links on network 150 by locally using IPv6 protocols, as further described and shown with respect to FIG. 3. The gateway 210 may also not use IPv6 extension headers in sent packets. The gateway 210, when it receives compressed IPv6 packet indicating compression context related to WKP, may directly decompress the IPv6 packet into native IPv4 packet format and then forward the decompressed packet to, for example, a destination, such as cloud server 122. In some instances, the gateway may first decompress the IPv6 packet into a full IPv6 format and then pass it to a network address translator for protocol translation into an IPv4 format.

In some example embodiments, a gateway, such as border gateway 210, may, as noted, indicate to one or more nodes, such as nodes 202A-C, that the nodes can transmit IPv4 packets towards Internet. The indication may be carried, in some example embodiments, by an advertisement message and, in some instances, a 6LoWPAN Context Option (6CO). In the example of FIG. 2, the 6LoWPAN Context Option (6CO) including the WKP is sent at 290A-C.

In some example embodiments, one or more nodes, such as nodes 202A-C, may detect, based on for example the received indicator signaled by the gateway (for example, 6CO including the WKP), that the gateway 210 has the capability to transmit IPv4 packets (for example, IPv4 uplink support to for example the Internet). In response to learning this context from the received indicator, one or more of nodes 202A-C may send for example 6LoWPAN encoded packets having destination's IPv4 address included inline in for example in a 64-bit IPv6 address Interface Identifier format (for example, the first 32 bits as zeroes and the last 32 bits as an IPv4 address).

Figure 3:
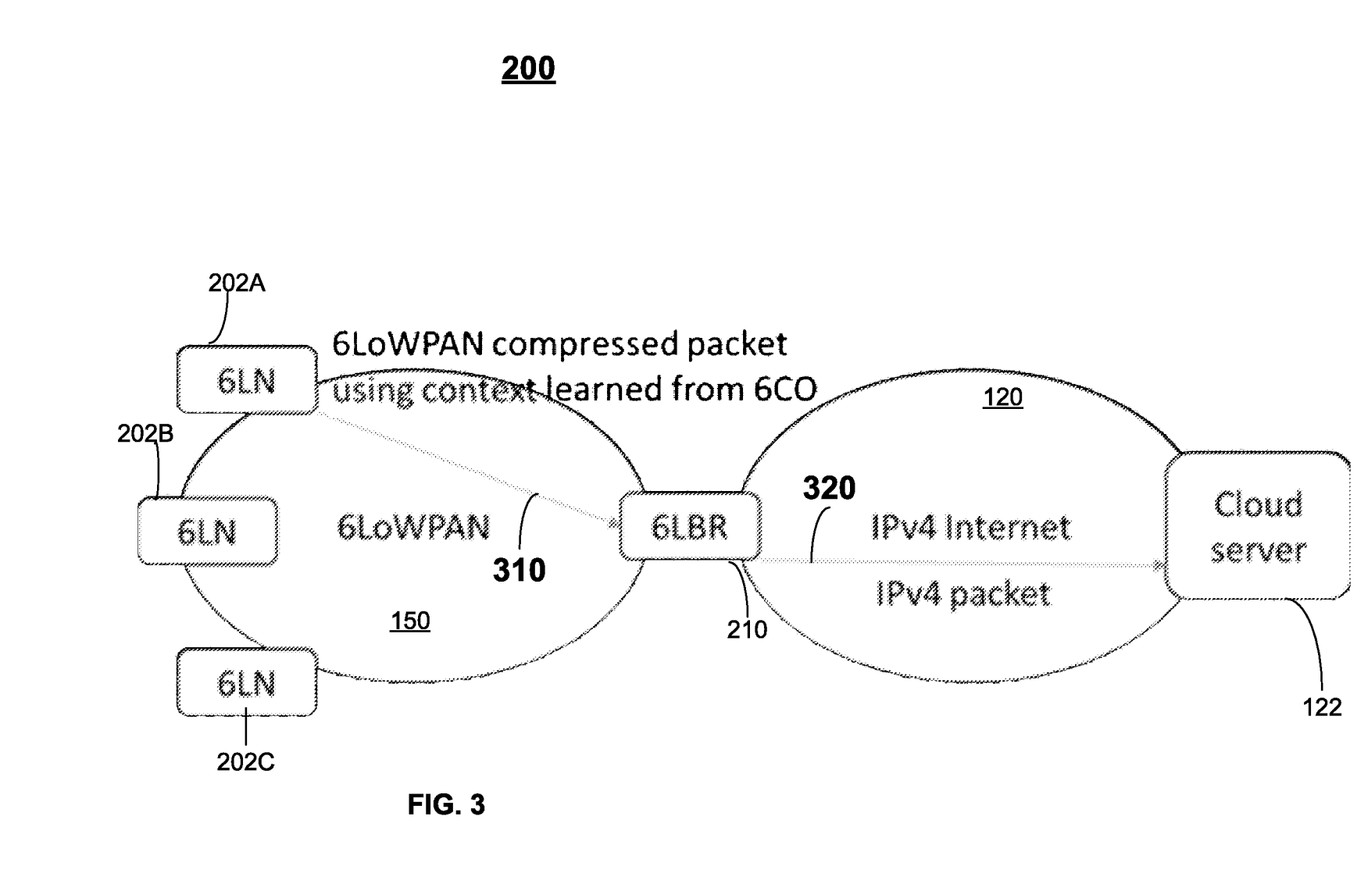

FIG. 3 depicts node 202A sending at 310 a compressed packet, such as a 6LoWPAN packet, in accordance with some example embodiments. The 6LoWPAN encoded packet sent at 310 may include the destination's IPv4 address (for example, of a destination device such as cloud server 122) inline in for example a 64-bit IPv6 address Interface Identifier format (for example, the first 32 bits as zeroes and the last 32 bits as an IPv4 address). Rather than including an IPv6 interface identifier in the packet at 310, node 202 may thus include the IPv4 address directly in the packet being sent at 310.

In some example embodiments, gateway 210 may then decompress the 6LoWPAN packet received from node 202A at 310 into an IPv4 packet, when the 6LoWPAN packet uses the context indicated at 290A by the 6CO. The gateway 210 may then forward the packet 320 to the destination, such as cloud server 122.

Although the previous example described sending packets from the nodes to the gateway and then on to the Internet 120 and for example the cloud server 122, packets may also be sent in the other direction as well so packets may have a destination of one or more nodes. For example, gateway 210 may process an IPv4 packet from the cloud server 122 into a 6LoWPAN formatted packet and then may send the 6LoWPAN formatted packet to a node, such as node 202A and the like. When this is the case, the source address is compressed using the context from 6CO and having an IPv4 address of for example the cloud server (instead of having source IPv6 interface identifier in packet being sent to node 202A).

In some example embodiments, when node 202A sends packets to Internet destinations, node 202A may use header compression. Moreover, the header compression may be in accordance with RFC 6282, Compression Format for IPv6 Datagrams over IEEE 802.15.4-Based Networks, September 2011. When this is the case, packets may be sent at 310 taking into account that gateway 210 is going to send packets as IPv4 packets. As such, node 202A may not use one or more features that are present only in IPv6, but instead node 202A may use the IPv4 address of the Internet destination (for example, cloud server 122) instead of destination's IPv6 interface identifier. Node 202A may thus send packets as per RFC 6282 (section 3.1.1 of RFC 6282), and node 202A may set one or more fields of LOWPAN_IPHC headers as shown in Table 1 below.

TABLE 1

TF = 11 (to indicate no traffic class and flow label)
NH = 1 (no IPv6 headers in this case)

TABLE 1-continued

HLIM = converted to IPv4 TTL (time-to-live)
CID = 1 (compression context received in 6CO is used)
SAC/SAM = compression on/off
M = 0
DAC = 1 (as the compression context received in 6CO is used)
DAM = 01 (6LN may send 32 bits of zeroes and 32 bits of IPv4 address)

Node 202A may also include in its packet context identifier extension an indication of the context received in 6CO at 290A. Node 202A may also include the IPv4 address, but due to certain limitations in RFC 6282 node 202A may send the packet at 310 in a 64-bit form (for example, 32 leading bits as zeroes and 32 following bits as IPv4 address, although other forms may be used such as 32 leading bits as IPv4 address, and then 32 bits as zeroes or do not care/fill bits).

Although the description herein refers to using the WKP prefix to signal the IoT nodes, other indicators, prefixes, and/or suffixes may be used as well to indicate that the gateway has IPv4 uplink support to another network, such as the Internet so packets will be sent by the gateway as IPv4 packets. For example, a dedicated flag may be reserved in the 6CO option to indicate the context is being used for protocol translation.

The gateway 210 may be configured to implement IPv4 network address translation (NAT) if it does not have sufficient IPv4 addresses. The gateway 210 may reserve private IPv4 addresses for each node 202A-C being served. Moreover, gateway 210 may decompresses 6LoWPAN packet into IPv4 packet having private IPv4 addresses as source and destinations IPv4 address as destination, and then gateway 210 may use IPv4 NAT function to translate this packet into a packet that uses gateway 210's external IPv4 address.

Although some of the examples described herein refer to specific protocols, the subject matter disclosed herein is not limited to the specific protocols mentioned as other protocols may be used as well.

Figure 4:
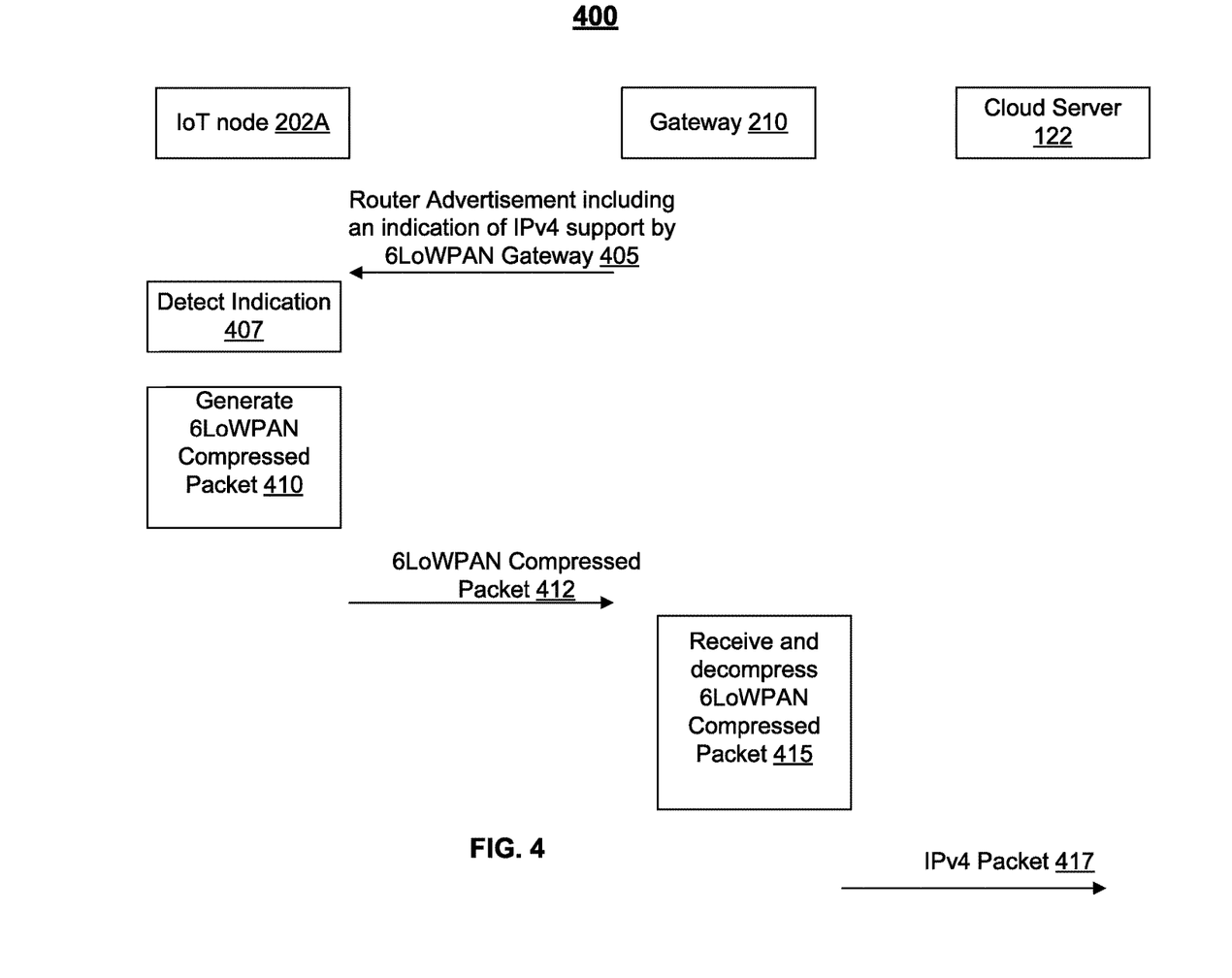
FIG. 4 depicts an example of a process which may be implemented by the systems of FIGS. 2 and 3, in accordance with some exemplary embodiments.

FIG. 4 depicts an example process 400 in accordance with some example embodiments. The description of process 400 also refers to FIGS. 2 and 3.

At 405, a gateway 210 may send to node 202A an indicator that the gateway 202A provides IPv4 uplink support to another network, such as the Internet, rather than IPv6 support, in accordance with some example embodiments. For example, gateway 210 may send an indicator, such as a value, prefix, and/or suffix to signal this support. In some example embodiments, the indicator may comprise the WKP, although other types of value, prefixes, and/or suffixes may be used. Moreover, the WKP may be carried by a 6LoWPAN Context Option (6CO), although other types of messages may be used to carry the indicator or WKP. In some example embodiments, the gateway 210 has both an IPv4 uplink and an IPv6 uplink, but gateway 210 may still want to send the indication in order to enable nodes to communicate with IPv4 only to other nodes, such as cloud server 122 and the like.

At 407, node 202A may detect the indicator sent by gateway 202A, in accordance with some example embodiments. At 410, node 202A may, in response to the detection at 407, generate a compressed packet configured to be carried on the local network IPv6 network 150, but the packet may include an IPv4 destination address to enable processing and forwarding by gateway 210 in accordance with some example embodiments. For example, node 202A may generate a compressed packet, such as a 6LoWPAN packet. The 6LoWPAN encoded packet may include the destination's IPv4 address (for example, of a destination device such as cloud server 122), rather than the IPv6 interface identifier of the destination device. At 412, node 202A may send the generated packet to gateway 210 in accordance with some example embodiments. At 415, gateway 210 may decompress the received packet and forward, at 417, the packet as an IPv4 packet to the destination device, such as cloud server 122, in accordance with some example embodiments.

Figure 5:
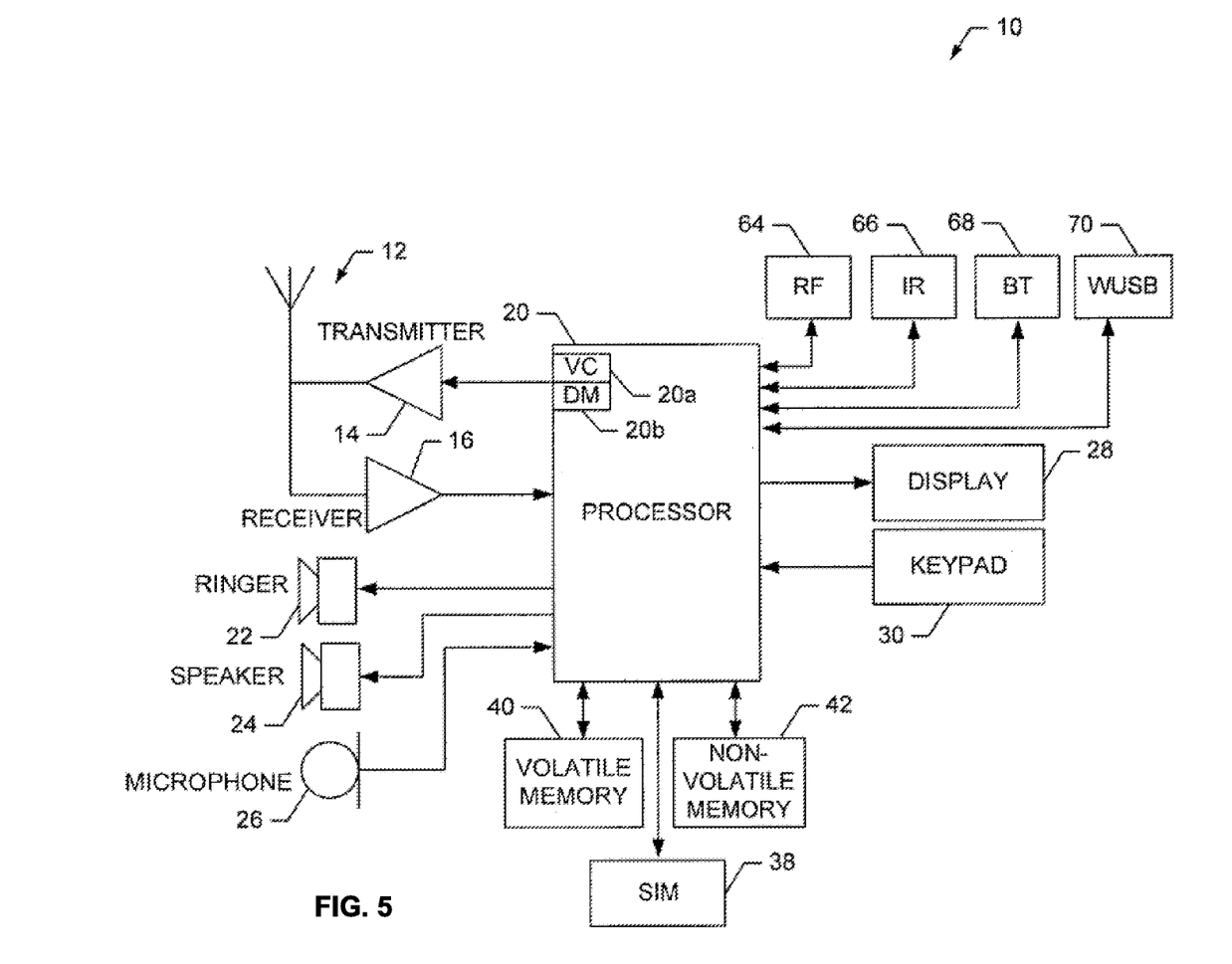
FIG. 5 depicts an example of an apparatus, in accordance with some exemplary embodiments.

FIG. 5 illustrates a block diagram of an apparatus 10, in accordance with some example embodiments. The apparatus 10 (or portions thereof) may be configured to provide a gateway, such as gateway 210 as well as the IoT nodes, 202A-C. In the case of IoT nodes, the apparatus may include reduced capabilities to provide for example an IoT sensor/device.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, Constrained Application Protocol (CoAP), and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWPAN, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations, such as process 400 and/or any other operations/functions disclosed herein (for example, sending an indicator, receiving a first packet received via a wireless network in accordance with internet protocol version 6, generating a second packet configured in accordance with internet protocol version 4, and forwarding the second packet via the uplink at the gateway) The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to process 400.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is that a node may communicate with IPv4 destinations without having to implement an IPv4 stack. Moreover, without in any way limiting the scope, interpretation, or application of the claims appearing below, another technical effect of one or more of the example embodiments disclosed herein is that a gateway may not need to implement encapsulation or a full NAT64 function as the node may send 6LoWPAN compressed packets that can be directly decompressed into IPv4 form.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed is:

1. A method comprising:
    sending, by a gateway including a first interface to an internet protocol version 6 low power wireless network and a second interface to an internet protocol version 4 network, an internet protocol version 6 advertisement over the internet protocol version 6 low power wireless network, wherein the internet protocol version 6 advertisement includes a context option carrying a prefix, wherein the prefix indicates, to an internet protocol version 6 node coupled to the internet protocol version 6 low power wireless network, a format for an internet protocol version 6 packet configured to carry an internet protocol version 4 address, wherein the prefix further indicates, to the internet protocol version 6 node, that the gateway provides an uplink to an internet protocol version 4 network, wherein the prefix comprises a predetermined value indicating a translation, by the gateway, from internet protocol version 6 to internet protocol version 4; and
    receiving, at the gateway and via the internet protocol version 6 low power wireless network, a first packet from the internet protocol version 6 node, wherein the first packet is formatted, based on the prefix, as the internet protocol version 6 packet, wherein the first packet is formatted to include a compressed 64-bit internet protocol version 6 destination address containing an internet protocol version 4 destination address.

2. The method of claim 1 further comprising:
    generating, at the gateway and based on the first packet, a second packet configured in accordance with internet protocol version 4, the second packet including the internet protocol version 4 destination address; and
    forwarding, by the gateway, the second packet via the uplink at the gateway.

3. The method of claim 2, wherein the prefix signals to the internet protocol version 6 node to send the first packet as a compressed internet protocol version 6 packet and to include the internet protocol version 4 destination address.

4. The method of claim 1, wherein the prefix represents the gateway does not provide an internet protocol version 6 uplink.

5. The method of claim 3, wherein the generating further comprises: decompressing, at the gateway, the compressed internet protocol version 6 packet by at least extracting the internet protocol version 4 destination address.

6. The method of claim 1, wherein the gateway comprises at least one of a gateway or a router, wherein the internet protocol version 6 node comprises at least one of a sensor, an actuator, a machine, or an internet of things node, and wherein the internet protocol version 6 low power wireless network includes at least one of a Bluetooth low energy wireless network, an IEEE 802.15.4 network, or a low power wireless personal area network.

7. The method of claim 1, wherein the prefix represents the gateway only provides the uplink to an internet protocol version 4 network and does not provide an internet protocol version 6 uplink.

8. An apparatus, comprising:
    at least one processor; and
    at least one memory including computer program code, the at least one memory and the computer program code configured to, with the at least one processor, cause the apparatus to at least:
        send an internet protocol version advertisement over an internet protocol version 6 low power wireless network, wherein the internet protocol version 6 advertisement includes a context option carrying a prefix, wherein the prefix indicates, to an internet protocol version 6 node coupled to the internet protocol version 6 low power wireless network, a format for an internet protocol version 6 packet configured to carry an internet protocol version 4 address, wherein the prefix further indicates, to the internet protocol version 6 node, that the apparatus provides an uplink to an internet protocol version 4 network, the apparatus including a first interface to the internet protocol version 6 low power wireless network and a second interface to the internet protocol version 4 network, wherein the prefix comprises a predetermined value indicating a translation, by the apparatus, from internet protocol version 6 to internet protocol version 4; and
        receive a first packet from the internet protocol version 6 node, wherein the first packet is formatted, based on the prefix, as the internet protocol version 6 packet, wherein the first packet is formatted to include a compressed 64-bit internet protocol version 6 destination address containing an internet protocol version 4 destination address.

9. The apparatus of claim 8, wherein the apparatus is configured to at least:
    generate a second packet, based on the first packet, configured in accordance with internet protocol version 4, the second packet including the internet protocol version 4 destination address; and
    forward the second packet via the uplink at the apparatus.

10. The apparatus of claim 8, wherein the prefix signals to the internet protocol version 6 node to send the first packet as a compressed internet protocol version 6 packet and to include the internet protocol version 4 destination address.

11. The apparatus of claim 8, wherein the prefix represents the apparatus does not provide an internet protocol version 6 uplink.

12. The apparatus of claim 10, wherein the apparatus is configured to at least decompress the compressed internet protocol version 6 packet by at least extracting the internet protocol version 4 destination address.

13. The apparatus of claim 8, wherein the apparatus comprises at least one of a gateway or a router, wherein the internet protocol version 6 node comprises at least one of a sensor, an actuator, a machine, or an internet of things node, and wherein the internet protocol version 6 low power wireless network includes at least one of a Bluetooth low energy wireless network, an IEEE 802.15.4 network, or a low power wireless personal area network.

14. An apparatus comprising:
   at least one processor; and
   at least one memory including computer program code, the at least one memory and the computer program code configured to, with the at least one processor, cause the apparatus to at least:
      receive an internet protocol version 6 advertisement over an internet protocol version 6 low power wireless network, wherein the internet protocol version 6 advertisement includes a context option carrying a prefix, wherein the prefix indicates to the apparatus, a format for an internet protocol version 6 packet configured to carry an internet protocol version 4 address, wherein the prefix further indicates that a gateway provides an uplink to an internet protocol version 4 network, wherein the prefix comprises a predetermined value indicating a translation at the gateway from internet protocol version 6 to internet protocol version 4; and
      transmit to the gateway a first packet formatted, based on the prefix, as the internet protocol version 6, wherein the first packet is formatted to include a compressed 64-bit internet protocol version 6 destination address containing an internet protocol version 4 destination address.

15. The apparatus of claim 14, wherein the apparatus is further configured to at least forward the first packet to the gateway via the internet protocol version 6 low power wireless network.

16. The apparatus of claim 14, wherein the prefix signals to the apparatus to send the first packet as a compressed internet protocol version 6 packet and to include the internet protocol version 4 destination address.

17. The apparatus of claim 14, wherein the prefix represents the gateway only provides the uplink to an internet protocol version 4 network and does not provide an internet protocol version 6 uplink.

18. The apparatus of claim 14, wherein the first packet includes a compressed header including the internet protocol version 4 destination address.

* * * * *